(12) United States Patent
Papadimitriou et al.

(10) Patent No.: US 8,095,644 B2
(45) Date of Patent: Jan. 10, 2012

(54) SYSTEM AND METHOD FOR ANALYZING WEB PATHS

(75) Inventors: Odiseas Papadimitriou, Arlington, VA (US); Manish R. Chhabra, Sterling, VA (US)

(73) Assignee: Capital One Financial Corporation, McLean, VA (US)

( * ) Notice: Subject to any disclaimer, the term of this patent is extended or adjusted under 35 U.S.C. 154(b) by 900 days.

(21) Appl. No.: 11/635,035

(22) Filed: Dec. 7, 2006

(65) Prior Publication Data

US 2008/0140697 A1    Jun. 12, 2008

(51) Int. Cl.
G06F 15/173 (2006.01)
G06F 15/16 (2006.01)
G06F 15/177 (2006.01)

(52) U.S. Cl. .......................... 709/224; 709/203; 715/736

(58) Field of Classification Search .................. 709/203, 709/219, 223, 224, 225; 370/252
See application file for complete search history.

(56) References Cited

U.S. PATENT DOCUMENTS

| | | | |
|---|---|---|---|
| 6,393,479 B1 | 5/2002 | Glommen et al. | |
| 6,721,780 B1 | 4/2004 | Kasriel et al. | |
| 6,766,370 B2* | 7/2004 | Glommen et al. | 709/224 |
| 6,789,115 B1 | 9/2004 | Singer et al. | |
| 6,963,874 B2 | 11/2005 | Kasriel et al. | |
| 6,993,590 B1 | 1/2006 | Gauthier et al. | |
| 7,349,827 B1* | 3/2008 | Heller et al. | 702/186 |
| 7,424,484 B2* | 9/2008 | Ma et al. | 1/1 |
| 7,543,059 B2* | 6/2009 | Johnson et al. | 709/225 |
| 2002/0147805 A1* | 10/2002 | Leshem et al. | 709/223 |
| 2003/0115333 A1 | 6/2003 | Cohen et al. | |
| 2003/0128231 A1 | 7/2003 | Kasriel et al. | |
| 2003/0131097 A1 | 7/2003 | Kasriel et al. | |
| 2004/0059746 A1 | 3/2004 | Error et al. | |
| 2004/0133671 A1* | 7/2004 | Taniguchi | 709/224 |
| 2004/0260807 A1 | 12/2004 | Glommen et al. | |

FOREIGN PATENT DOCUMENTS

WO    WO 2004/109532 A1    12/2004

* cited by examiner

*Primary Examiner* — Wen-Tai Lin
(74) *Attorney, Agent, or Firm* — Finnegan, Henderson, Farabow, Garrett & Dunner, LLP

(57) ABSTRACT

A method for analyzing web page paths associated with accesses to one or more web pages associated with one or more websites is disclosed. The method includes storing, for each instance of a web page access of the one or more web pages, time of access data, page access data, and entity data. The method further includes, for each entity reflected in the storage, determining one or more web page paths traversed by the entity based at least on the time of access data and the page access data, wherein each path includes accesses to at least two web pages. The method additionally includes analyzing at least one of the one or more websites or at least one of the one or more web pages, based on the determined one or more web page paths, and providing the analysis to one or more users or software processes.

17 Claims, 6 Drawing Sheets

| | Entity ID | Date | Time Stamp | Code |
|---|---|---|---|---|
| Row A | User1 | 11/1/2006 | 11:29:30 a.m. | A |
| | User1 | 11/1/2006 | 11:29:50 a.m. | 2 |
| | User1 | 11/1/2006 | 11:30:06 a.m. | A |
| | User1 | 11/1/2006 | 11:30:36 a.m. | 1 |
| | User1 | 11/1/2006 | 11:30:41 a.m. | 1a |
| | User1 | 11/1/2006 | 11:35:00 a.m. | D |
| | User1 | 11/1/2006 | 11:35:30 a.m. | B |
| | User1 | 11/1/2006 | 12:15:00 p.m. | C |
| Row I | Computer10 | 11/1/2006 | 1:25:00 a.m. | A |
| | Computer10 | 11/1/2006 | 1:25:30 a.m. | B |
| | Computer10 | 11/1/2006 | 1:27:30 a.m. | 4 |
| | Computer10 | 11/1/2006 | 1:30:00 a.m. | B |
| | Computer10 | 11/1/2006 | 1:50:00 a.m. | A |
| | Computer10 | 11/1/2006 | 1:50:30 a.m. | 3 |
| | Computer10 | 11/1/2006 | 1:52:30 a.m. | C |
| Row P | SessionXYZ | 11/2/2006 | 11:59:56 p.m. | A |
| | SessionXYZ | 11/3/2006 | 12:00:01 a.m. | 2 |
| | SessionXYZ | 11/3/2006 | 12:00:06 a.m. | E |
| | ⋮ | ⋮ | ⋮ | ⋮ |

310 — Entity ID
320 — Date
330 — Time Stamp
340 — Code

400

500

SYSTEM AND METHOD FOR ANALYZING WEB PATHS

BACKGROUND OF THE INVENTION

I. Field of the Invention

The present invention relates to systems and methods for analyzing web paths. More particularly, the invention relates to systems and methods for identifying and analyzing web paths traversed by one or more entities.

II. Background and Material Information

To gain a better idea of how users interact with web pages, website owners often use monitoring software that collects data associated with individual web pages and web page accesses. This data may include web page URL or URI information, time stamp information, duration of web page visit information, visitor connection speed, page download time, a user ID, cookie ID, or other identifier of the entity accessing the page, geographical location of the visitor, and other information associated with the web page access. The collected data may be stored in a web log data file, which is typically a raw non-sortable data file that stores information regarding visits to monitored web pages. The web log data file may store web page access information for one or more web pages associated with a single website or multiple websites, and may collect the information from one or more servers or other computer systems on a network.

The information stored in the web log data file is typically used to analyze traffic data related to each individual page in the monitored website. Thus, for each page, traffic data such as a number of visits, average duration of visits, visitor location, etc., may be analyzed and used to reconfigure the page or website. Some existing systems additionally track, for each web page access, the previous page accessed and the following page accessed. Using this information, an analysis may determine how effective certain pages are at eliciting visits to subsequent pages.

Although these systems provide general analysis of individual web page access, they fail to analyze web paths traversed by individual visitors of a website. Thus, these systems do not analyze web paths from the perspective of a user, or traversing entity. Accordingly, there is a need for a system and process that analyzes data reflecting the paths taken by all website visitors, and provides information reflecting an overall visitor experience for the website.

The disclosed embodiments are directed to overcoming one or more of the problems set forth above.

SUMMARY OF THE INVENTION

The disclosed embodiments include systems and methods for analyzing web paths. One embodiment includes a method for analyzing web page paths associated with accesses to one or more web pages associated with one or more websites. The method includes storing in a storage, for each instance of a web page access of the one or more web pages, time of access data reflecting a time of access associated with the instance of the web page access, page access data reflecting an identification of the web page accessed, and entity data reflecting the entity associated with the instance of the web page access. The method further includes, for each entity reflected in the storage, determining one or more web page paths traversed by the entity based at least on the time of access data and the page access data, wherein each path includes accesses to at least two web pages. The method additionally includes analyzing at least one of the one or more websites or at least one of the one or more web pages, based on the determined one or more web page paths, and providing the analysis to one or more users or software processes.

Another embodiment includes a method for reconfiguring a website based on traversed web paths. The method includes determining, based on a plurality of accesses to one or more websites, a plurality of web paths traversed on the one or more websites. The method additionally includes, for each of the plurality of paths, determining a frequency of traversals of the web path. The method further includes analyzing the determined frequency of traversals of each web path traversed on the one or more websites, and based on the analysis, reconfiguring at least one of the one or more websites.

A further embodiment includes a system for analyzing web paths associated with accesses to one or more web pages associated with one or more websites. The system includes a computer system including a storage that stores, for each instance of a web page access of the one or more web pages, time of access data reflecting a time of access associated with the instance of the web page access, page access data reflecting an identification of the web page accessed, and entity data reflecting the entity associated with the instance of the web page access. The system additionally includes an analysis system that determines, for each entity reflected in the storage, one or more web paths traversed by the entity based at least on the time of access data and the page access data, wherein each path includes accesses to at least two web pages. The system further includes a display that displays information reflecting one or more web path traversals, based on the analysis.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate the features and aspects of the disclosed embodiments.

In the drawings:

FIG. 3 illustrates an exemplary data file reflecting stored web page access data consistent with certain disclosed embodiments;

DETAILED DESCRIPTION

Systems and methods consistent with the disclosed embodiments provide website owners, administrators, designers, and the like, with tools to better analyze website visitor behavior. The tools determine the paths taken by users traversing one or more websites, and aggregate the collected path data to discover how pages of the one or more websites are traversed by users. Based on an analysis of the path data, entities associated with these websites may change the website design or alter business models according to monitored user behavior.

The storage media referred to herein may reflect elements that temporarily or permanently store data and instructions. The storage functions associated with the disclosed embodiments of the present invention may be implemented via a computer, portions of a computer, a processor, a computer network, and any other component and medium capable of storing information. For example, various types of storage media may be used to store information associated with the embodiments of the present invention, such as read-only memory (ROM), random access memory (RAM), and any other type of memory. Further, the storage functions associated with the disclosed embodiments may be physically implemented by computer-readable media, such as, for example (a) magnetic media (e.g., a magnetic disk, a tape drive, etc.; (b) optical media, (e.g., a CD-ROM, digital versatile disk (DVD), a mini-disc, etc.); and (c) semiconductor or other media (e.g., DRAM, SRAM, EPROM, EEPROM, flash memory, etc.).

Further, embodiments consistent with the present invention may be implemented using various types of transmission protocols and data formats, such as, for example, transmission control protocol/internet protocol (TCP/IP), hyper text transfer protocol (HTTP), secure HTTP, wireless application protocol (WAP), hyper text markup language (HTML), extensible markup language (XML), Standard Generalized Markup Language (SGML), etc.

Figure 1:
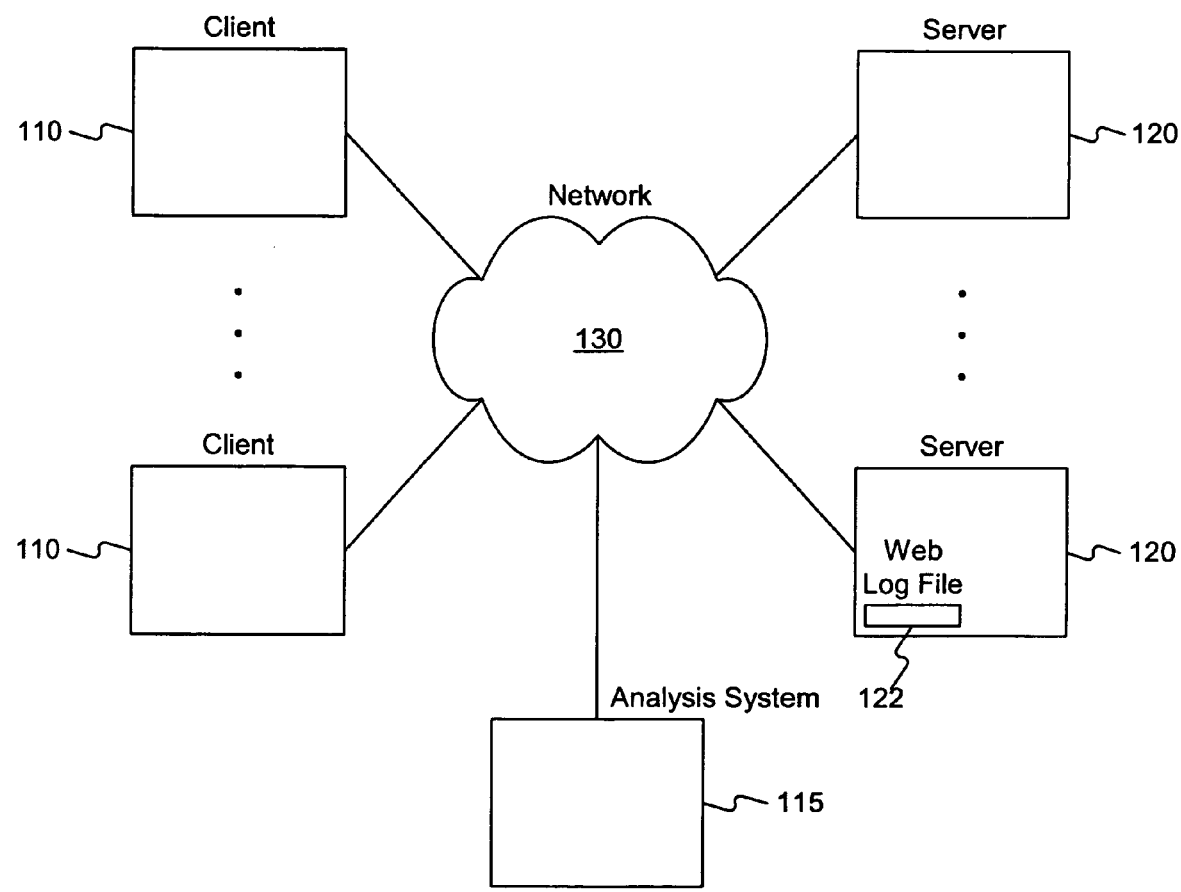
FIG. 1 is a diagram of an exemplary system environment, consistent with certain disclosed embodiments.

FIG. 1 illustrates an exemplary system 100, consistent with one or more disclosed embodiments. In one embodiment, system 100 includes one or more client computer systems 110, one or more server systems 120, and a network 130. System 100 may also include analysis system 115, and one or more web log data files 122, which is shown, for example, as hosted by a server system 120.

Client computer systems 110 may be one or more computer systems capable of accessing the World Wide Web (hereinafter referred to as the "web"). For example, in one embodiment, computer systems 110 may include one or more computer or data processing devices that have hardware (e.g., processors, storage memory, data buses, network interface, etc.), software (e.g., web browsers, application programs, operating systems, other executable program code written in any known programming language such as C, C++, Java™, etc.), and/or firmware (e.g., software embedded in a hardware device). Client computer systems 110 may access web pages at one or more websites maintained on one or more server computer systems 120. Client computer systems 110 may be one or more of desktop PCs, laptop PCs, PDAs, cell phone devices, or any other device or group of devices capable of accessing the Web.

Server computer systems 120 may be one or more computer systems capable of hosting one or more websites. For example, in one embodiment, server computer systems 120 may each include one or more computer or data processing devices that have hardware (e.g., processors, storage memory, data buses, network interface, etc.), software (e.g., application programs, operating systems, other executable program code written in any known programming language such as C, C++, Java™, etc.), and/or firmware (e.g., software embedded in a hardware device) that provide access to stored web pages. An individual computer system may be both a client computer system and a server computer system.

In one embodiment, users of client computer systems 110, or in some instances computer programs executed by client computer systems 110, access websites stored on one or more of server computer systems 120 via network 130. Network 130 may be any type of wireless or wire-line computer network or related infrastructure (e.g., the Internet, an intranet, a Local Area Network (LAN), etc.) that communicates data. The websites may include one or more web pages accessible by, for example, a user "clicking" on a hyperlink located on another web page, entering a Uniform Resource Locator (URL) into a web browser, etc. Each visit to a web page may be recorded and stored in a web log data file, such as web log data file 122, which stores visit information, such as a URL or Uniform Resource Identifier (URI), time of page access, duration of page access, visitor connection speed, page download time, a user ID, cookie ID, and/or other types of identifiers of the entity accessing the page, geographical location of the visitor, and/or other information associated with the web page access. Although web log data file 122 is depicted as a single file on a single server system 120, any known web log data file structure may be used to implement the system and method of the disclosed embodiments, such as distributed files located locally or remotely to server system 120.

Analysis system 115 may be configured to store and analyze information in accordance with one or more methods consistent with the disclosed embodiments. In one embodiment, analysis system 115 includes one or more software tools that perform automatic database searches and queries. Analysis system 115 may be implemented using any suitable software (e.g., Oracle™, Microsoft Access™, etc.) that employs any suitable data analysis (e.g., SQL searches and queries, analysis reports, etc.) on information stored in a searchable and/or sortable format. Analysis system 115 may be part of one or more client computer systems 110, one or more server computer systems 120, or any other entity connected to network 130.

Figure 2:
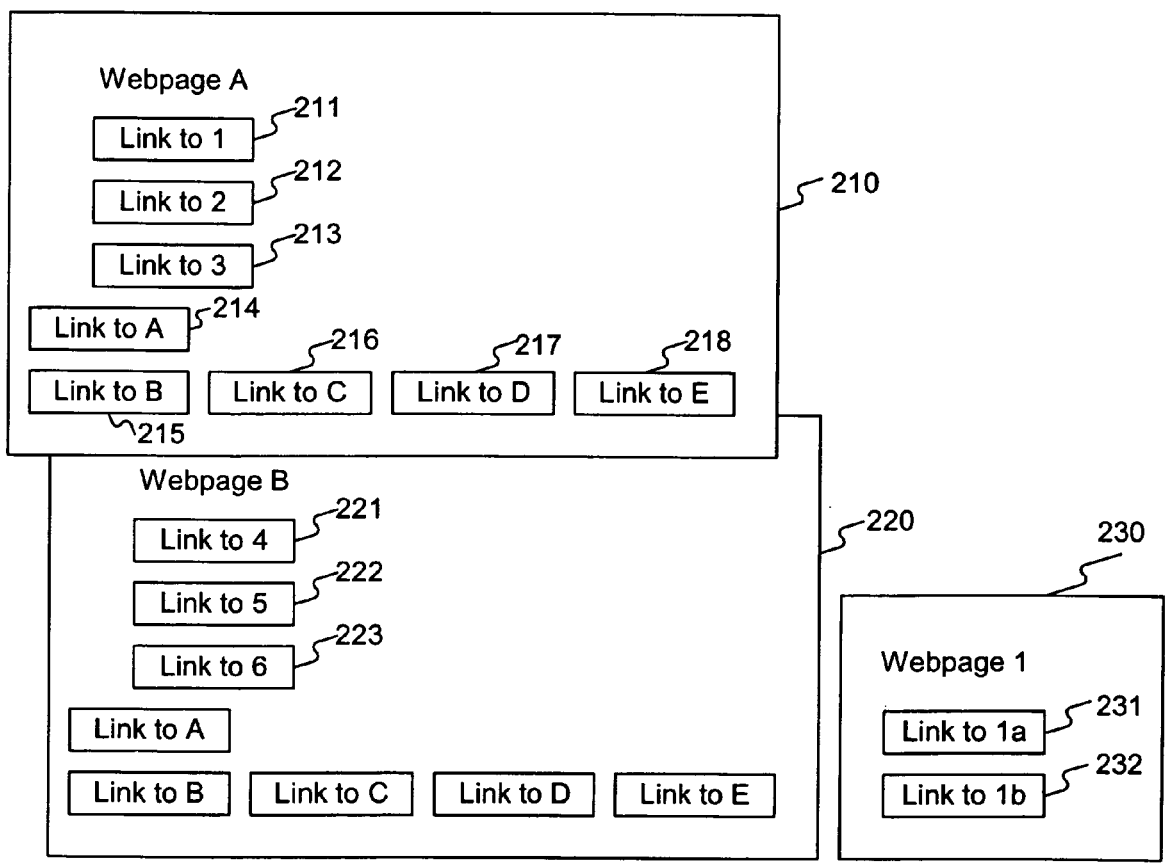
FIG. 2 is a diagram of an exemplary set of web pages, consistent with certain disclosed embodiments.

An example of a website and web pages consistent with certain disclosed embodiments is depicted in FIG. 2. The web pages depicted in FIG. 2 may be part of the same website or part of different websites. A website may include a set of interrelated web pages that may be stored on one or more servers, and may be owned, operated, and/or managed by one or more entities. For example, an exemplary website may include interrelated web pages having "capitalone" in their domain name.

In one embodiment, websites and web pages may be stored at server computer systems, and may be accessed from client computer systems 110 using, for example, browser software. For example, a client computer system 110 may be directed to a website and/or web page using a Uniform Resource Locator (URL), which references the website or web page or other resources located on a network (e.g., the Internet). For illustration purposes, the URL may be, for example, http://www-.capitalone.com/creditcards. The URL may include an access protocol indicator (e.g., http, ftp, etc.), a domain name (e.g., www.capitalone.com), and other optional information, such as a path to a file or resource on a server (e.g., creditcards) or additional identification information (e.g., search query string, user ID information, cookie information, session information, etc.). A Uniform Resource Identifier (URI) reflects a reference to a file or resource on a network. A URI may be formatted in different manners. As such, a URL may be a type of URI. For the purposes of this application, the term URI refers to any reference that identifies, for location purposes, a file or resource on a network (e.g., "www.capitalone.com," "http://www.capitalone.com," "www.capitalone.com/creditcards," etc.).

FIG. 2 depicts a number of exemplary web pages, each having one or more references (i.e. links) to other web pages. For simplicity, the web pages are labeled with web page A, web page B, web page C, web page 1, etc. In one embodiment, each web page depicted in FIG. 2 may be accessible by a computer system via a unique URL. In the embodiment shown in FIG. 2, web page A (210) includes references to web page 1 (211), web page 2 (212), web page 3 (213), web page A (214), web page B (215), web page C (216), web page D (217), and web page E (218). In one embodiment, a user using, for example, client computer system 110, may access each of these web pages by entering a URL into a browser interface, or selecting a hyperlink (e.g., by clicking a mouse, using a touch screen, etc.) to access the target web page at an associated URL. Web pages may also be accessed by other methods, such as a "back" or "forward" button on a web browser.

In one embodiment, referenced web pages may include references to other web pages. For example, web page B (220) includes references to web page 4 (221), web page 5 (222), and web page 6 (223). Web page 1 (230) includes further references to additional web pages 1a (231), and 1b (232). When a user operating client computer system 110 selects any of these references, the browser performs one or more processes to access the selected web page indicated in the selected reference using the URL associated with the reference.

In one embodiment, server system 120 may execute software that records and stores information related to each access of a web page or website. The information may include a URL or URI, time of page access, duration of page access, visitor connection speed, page download time, a user ID, cookie ID, or other identifier of the entity accessing the page, geographical location of the visitor, and other information, may be stored in the storage or database as well. In one embodiment, this information is stored in web log data file 122.

In another embodiment, server system 120 may collect and store information derived from a web log data file 122 or other data source in a path data file or other type of storage format. FIG. 3 illustrates an exemplary path data file 300 consistent with the disclosed embodiments. In one embodiment, path data file 300 may include, for each instance of a web page accessed, an entity ID (310), a date of access (320), a time of access (330), and a code (340). The entity ID (310) may be any identifier of an entity that accesses the given web page. For example, the entity ID for row A, "User1," may be an identifier of a user who accessed or is accessing the web page, and may be derived from an entered login username, a cookie passed to the server, or any other information that identifies a user who accesses the page. Further, the entity ID for row I, "Computer10," may be an identifier of a computer or other device that accessed or is accessing the web page, and may be derived from an IP address of the computer, a MAC address, a cookie, or other device identification information. As another example, the entity ID for row P, "SessionXYZ," may be an identifier of an access session for a particular website or other set of web pages. User IDs, computer IDs, and session IDs are all well known in the art. Other known types of identifiers may be used as well that identify an entity accessing a set of web pages.

Path data file 300 may additionally include date column 320, time stamp column 330, and code column 340. Date column 320 and time stamp column 330 store an indication of date and time that a page is accessed. Code column 340 stores a code that indicates the web page visited. For example, the code may be a URL or URI indicating the web page visited. The code may also be a portion of a URL or URI visited, or a text string that symbolizes a particular URL or URIs or set of URLs or URIs. For example, in one embodiment, the code may include an access protocol indicator, domain name, and path, but may not include search query string or other additional information attached to the actual URL accessed. In another embodiment, the code may be assigned to a particular web page or group of web pages. For example, a code of "Website home" could be assigned to a website's homepage, while "Website finance" could be assigned to the website's finance pages, "Website sports" could be assigned to the website's sports pages, etc. As such, path data file 300 may store information regarding specific web pages indicated by unique URLs (e.g., with search strings, and additional information attached), more general web pages indicated by less unique URLs (e.g., without search strings or additional information attached), and/or groups of web pages, such as sports pages, e-mail pages, finance pages, etc.

Based on date column 320 and time stamp column 330, analysis system 115 may determine the time of access for each instance of each web page access. Thus, path data file 300 stores, for each entity, a list of all web pages (e.g., URIs or other assigned codes associated with the web pages) accessed by the entity, and times of each access. In the exemplary data file 300, web page codes of A, B, C, D, E, 1, 2, 3, 4, 1a, etc., are used to indicate associated web pages. Based on this information, analysis system 115 may determine one or more paths of web pages traversed by each entity.

Figure 4:
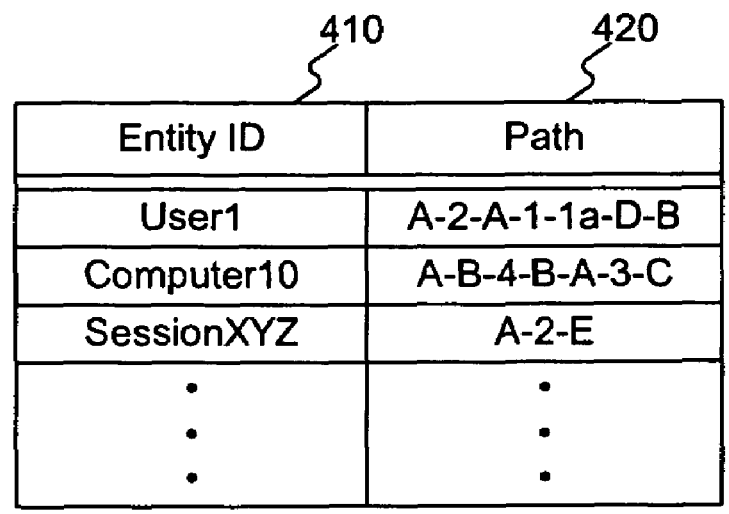
FIG. 4 illustrates an exemplary data file reflecting stored path data consistent with certain disclosed embodiments.

In one embodiment, web paths (e.g., traversed paths) are determined from path data file 300 and are stored in a complete path data file. FIG. 4 shows an exemplary complete path data file 400, consistent with certain disclosed embodiments. For example, each instance of a complete path traversed may be stored in column 420 of complete path data file 400. An entity associated with each complete path may also be stored, for example, in column 410 of complete path data file 400. Additional information associated with a complete path may also be stored in complete path data file 400 (e.g., a start time and date of the path traversed, end time and date of the path traversed, etc.).

In one embodiment, a complete path may begin at the first web page accessed by the entity and may include all consecutive web pages accessed by an entity until a termination web page. A termination web page may be, for example, a web page accessed by an entity more than a particular amount of time (e.g., 20 minutes, 30 minutes, 1 hour, etc.) before the subsequent web page accessed by that entity, or a web page accessed immediately before a session or browser displaying the page is closed (e.g., determined from a session id or cookie passed between a client and server). For example, based on the access times stored in path data file 300 for entity "User1," a complete path for User1 may include a web page path of A-2-A-1-1a-D-B. In this embodiment, the complete path would not include the last page C visited by User1 because page C was accessed more than 30 minutes after the previous page B. The 30 minute time period is given as an example, and the disclosed embodiments may implement any time period as a path termination time limit. Any suitable software application or programming language (e.g., Oracle, SQL, etc.) employed by analysis system 115 may be used to determine the complete path based on the data stored in web log data file 122 and/or path data file 300.

Based on the complete paths stored in complete path data file 400, analysis system 115 may perform an analysis of traversed web paths. For example, analysis system 115 may perform a search of complete path data file 400 for all paths of the first five web pages traversed by entities at a particular website. Another search may be performed that searches complete path data file 400 for all paths of three consecutive web pages traversed by entities at a particular website. Other searches may be performed to discover additional paths traversed by entities at one or more websites. For example, one search may query path data file 400 for all paths starting at a particular page within the website.

Analysis system 115 may additionally store statistics associated with the traversed paths. For example, analysis system 115 may determine and store the number of occurrences of each traversed path for different path types. In another embodiment, analysis system 115 may search the data for all entities, to determine every n-page path traversed at a determined website during a determined time period where the first page is a particular page (e.g., page A in FIG. 2). In the example shown in FIGS. 2, 3, and 4, an analysis of n-page paths including 3-page paths, for example, may include web page sequences, such as A-2-A, A-1-1a, A-B-4, A-3-C, A-2-E, etc. Analysis system 115 may also determine how often certain paths are traversed (e.g., path A-2-A is traversed 200 times, or in 20% of all 3-page path traversals, path A-1-1a is traversed 150 times, or in 15% of all 3-page path traversals, etc.). The results of the analysis may be presented to a user in an audio, visual, or other format (e.g., table, chart, graph, sound recording, etc.). The result may be requested by a user or automatically provided via e-mail, pager, web page link, telephone, etc. This analysis may identify, to a website owner, designer, a software process, etc., which paths are most often traversed. The analysis may be used to further analyze the effectiveness of the website and/or to recommend possible website or web page reconfiguration.

Analysis system 115 may determine and store other statistics as well. For example, based on the time of access information (e.g., time stamp and/or date), analysis system 115 may determine the average time spent accessing each web page within a traversed web page path. Thus, looking to FIGS. 2, 3, and 4 as an example, if ten entities have traversed the A-2-E path depicted in path data file 300 and complete path file 400, analysis system 115 may determine that the average time among those entities spent accessing web page A is six seconds and accessing web page 2 is five seconds. The average time spent accessing pages of a traversed path may be stored for a number of paths and pages. Based on the analysis of these times, a website administrator, software process, and/or other entity, may recognize that certain pages of a path are bypassed while others are not. As a result, the administrator, software process, and/or other entity may update the web pages to provide easier reference to more popular web pages. For example, a reference from web page E to web page A may be implemented to avoid traversing through middle web page 2.

Additional analyses may be performed based on stored path information and stored time information as well. For example, if analysis system 115 determines that a certain path is traversed by many entities a determined number of times, the website design may be changed to include content from each web page of the path on a common web page (e.g., the initial web page in the path). In another embodiment, analysis system 115 may search for the first five web pages traversed the most often by entities. Based on the analysis, website designers, software processes, and/or other entities, may perform processes that improve the look and feel (e.g., content) of those five pages within the website. In yet another embodiment, a website designer, software process, and/or other entity may change the hierarchy of certain web pages and/or their references in a website when it is determined that one path is traversed more often than another. Further analyses of paths and changes to website design may be performed as well.

Figure 5:
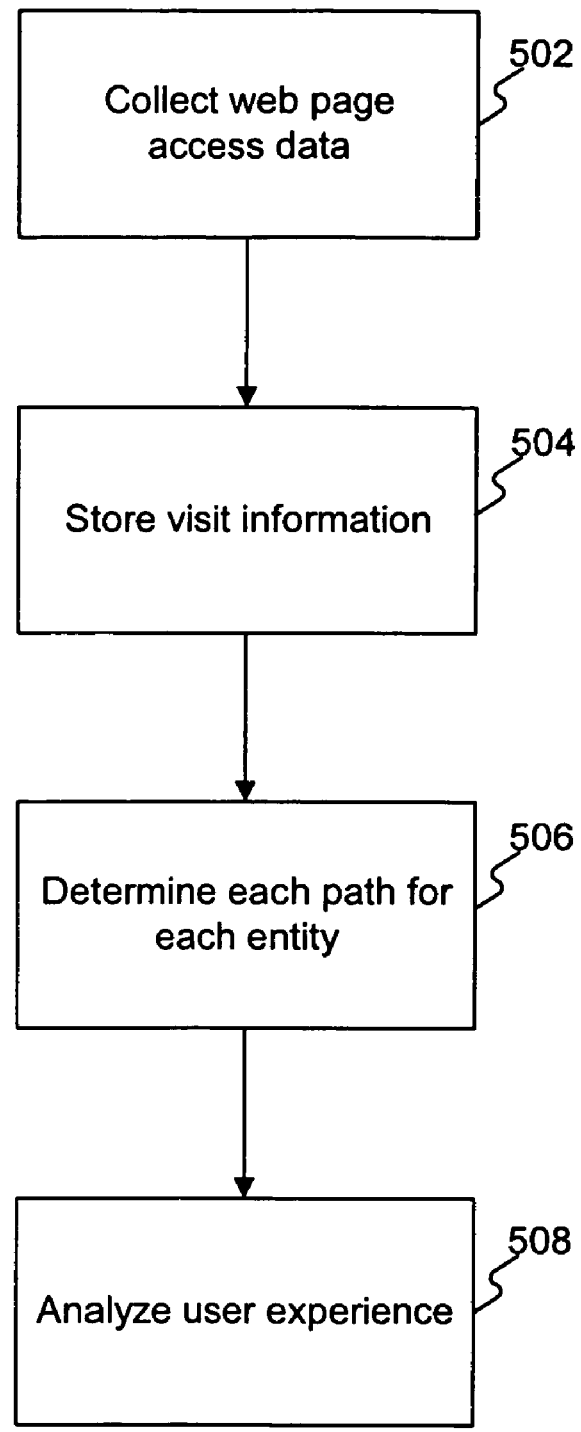
FIG. 5 illustrates an exemplary path analysis method consistent with certain disclosed embodiments.

FIG. 5 illustrates an exemplary path analysis method 500 consistent with certain disclosed embodiments. Path analysis method 500 determines paths, and uses the paths to analyze customer experience at one or more websites. In step 502, an analysis system, such as analysis system 115, collects web page access data. In one embodiment, the web page access data may be associated with one or more websites having one or more web pages. The data may be collected from any data source that provides information associated with web page accesses. For example, in one embodiment, the data may be collected from a web log data file. In another embodiment, the data may be collected directly from a client browser.

In step 504, the analysis system stores visit information associated with each instance of a web page access of the one or more web pages. In one embodiment, this information may include data reflecting a time of access (e.g., time, or time and date), data reflecting a web page accessed (e.g., a web page code, or other web page identifier), and/or data reflecting the entity accessing the web page (e.g., a user id, computer id, session id, or other entity identifier). In step 506, for each entity reflected in the storage, the analysis system determines the one or more paths traversed at one or more websites. In one embodiment, the determination is made for each entity based at least on the stored entity identifier, the stored time of access information, and stored code data reflecting the web page accessed. Further, each determined path may include at least two traversed web pages.

In step 508, the analysis system processes a record of at least one of the determined paths to analyze a user experience at the one or more visited websites. For example, one of the determined paths may be traversed by a certain number of entities a certain number of times. The analysis system may present information to a user via, for example, a visual display (e.g., graph, text, chart, etc.), or to a software process for further analysis. Based on the number of traversals, the website may be reconfigured (e.g., changed, updated, replaced, edited, revised, redesigned, etc.) to more effectively convey the information reflected in the pages included in the path. The website may be reconfigured using any known web design software and/or hardware. In one embodiment, the steps of method 500 may be performed automatically by an analysis system employing one or more suitable analysis software programs and/or languages (e.g., Oracle, Microsoft Access, SQL, etc.), and/or manually by a designer or other system user.

Figure 6:
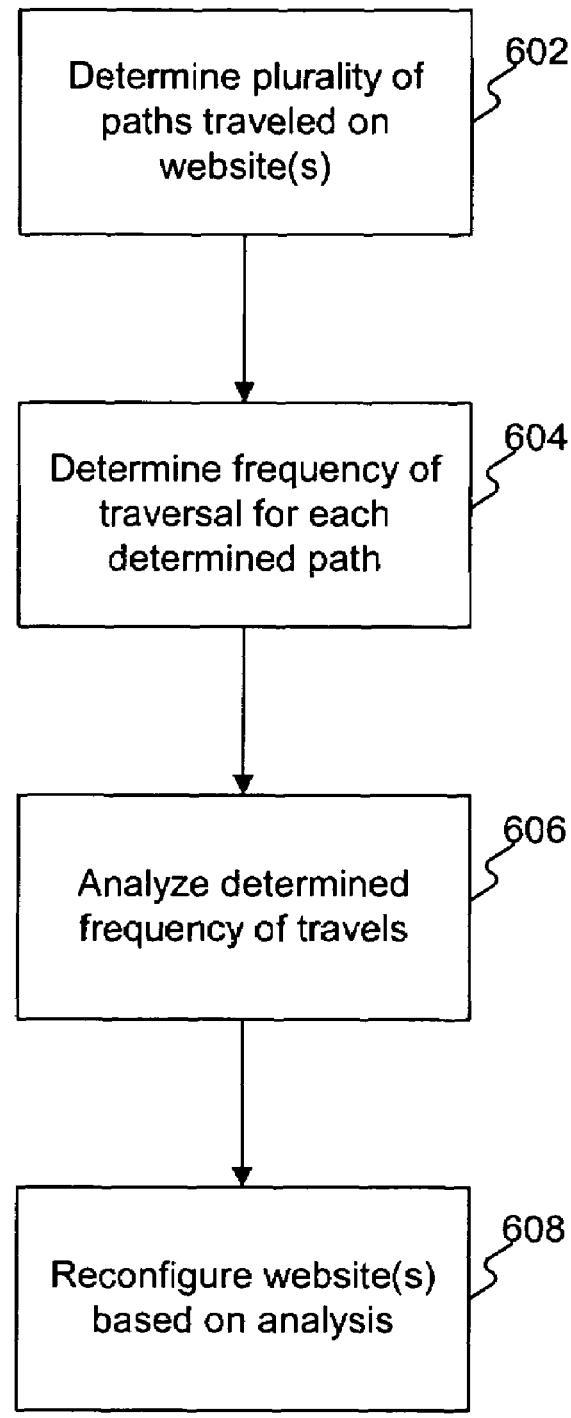
FIG. 6 illustrates an exemplary path analysis method consistent with the certain disclosed embodiments.

FIG. 6 illustrates an exemplary path analysis method 600 for reconfiguring a website, consistent with certain disclosed embodiments. In step 602, an analysis system determines a plurality of web paths traversed on one more websites, based on a plurality of entity accesses to the one or more websites. In one embodiment, the analysis system may determine each of the web paths based on a series of consecutively traversed web pages, or other web files or resources available over a network. In one embodiment, certain determined paths may be traversed more than once, by one or more entities.

In step 604, the analysis system determines, for each of the plurality of determined paths, a frequency of traversals (e.g., number of traversals, percentage of traversals, etc.). For example, a particular path in a website may have been traversed a specific number of times during a given time period (e.g., 200 times in the past 3 days), or for a certain percentage of all web paths traversed during a time period (e.g., 20% of all web paths traversed). In step 606, the frequency of traversal for the web paths is analyzed. For example, in one embodiment, the frequency of traversal of different web paths may be compared to determine which path is most often traversed. In another embodiment, both a frequency of traversal of a path and a time spent accessing at least one web page of the path is analyzed.

In step 608, based on the analysis of the determined frequency of traversals and/or the time spent accessing at least one web page of the path, at least one of the one or more websites is reconfigured. The website may be reconfigured, for example, by changing website references on one or more web pages of the website, combining features of different web pages, eliminating certain web pages, changing, adding, or removing content in one or more web pages, or in any other desired way. Furthermore, the website may be reconfigured using any known web design or web creation tool (e.g., software program, etc.).

By determining and analyzing entire web paths taken by entities traversing a website, a user or software process receives data reflecting which paths are traversed, and the frequency of those traversals. This information may be used, for example, by a user to redesign the website to adjust to the type of browsing that one or more website users are experiencing. The website may thus be altered to improve browsing experience, increase browsing efficiency, better target desired website visitors, and become a more marketable and profitable site.

It will be apparent to those skilled in the art that various modifications and variations can be made to the web path analysis system and method described herein. Other embodiments will be apparent to those skilled in the art from consideration of the specification and practice of the disclosed web path analysis system and method. It is intended that the specification and examples be considered as exemplary only, with a true scope being indicated by the following claims and their equivalents.

What is claimed is:

1. A computer-implemented method for analyzing web page paths associated with accesses to one or more web pages associated with a plurality of websites, comprising:

storing in a storage, time of access data reflecting a time of access associated with each instance of a web page access of the one or more web pages of the plurality of websites, page access data reflecting an identification of each accessed web page, and entity data reflecting an entity associated with each instance of the web page access;

for each entity reflected in the storage, determining, by a processor, one or more web page paths traversed by the entity based on at least the time of access data and the page access data, wherein each web page path includes accesses to at least two web pages, the page access data includes a web page code, and each web page path includes a set of web page codes configured in consecutive time order, such that a time of access difference between a first time and a second time is less than a predetermined time period, wherein the first time reflects a time that a first web page of any two consecutive web pages reflected in the web page codes is accessed, and the second time reflects a time that a second web page of the any two consecutive web pages is accessed;

determining, by the processor, based on the determined one or more web page paths, an average access time for each web page of the plurality of websites;

analyzing, by the processor, entity interaction with the plurality of websites, based on the average access times and the determined one or more web page paths to determine one or more statistical values indicating whether a web page is bypassed by the entity in traversing the plurality of websites; and providing, by the processor, the one or more statistical values to one or more users or software processes.

2. The computer-implemented method of claim 1, wherein determining the one or more web page paths traversed by each entity further includes:

determining, by the processor, each web page path based on a time order of the stored time of access data.

3. The method of claim 1, further comprising:

determining, based on a plurality of entity accesses to the one or more websites, a plurality of web page paths traversed on the one or more websites; and for each of the plurality of web page paths, determining a frequency of traversals of the web page path.

4. The method of claim 3, wherein the frequency of traversals for each web page path of the plurality of web page paths, is determined according to a number of traversals of the web page path, or according to a percentage of the number of traversals of the web page path in relation to a number of overall web page path traversals on the one or more websites.

5. The method of claim 3, further comprising:

analyzing the frequency of traversals of each web page path traversed on the one or more websites; and reconfiguring at least one of the one or more websites based on the analysis.

6. The method of claim 5, wherein reconfiguring at least one of the one or more websites further includes one or more of:

changing web page references on the one or more websites;

combining contents or references from separate web pages of the one or more websites onto a common web page;

inserting one or more web page references into one or more web pages of the one or more websites; and removing one or more web page references from one or more web pages of the one or more websites.

7. The method of claim 3, further comprising:

collecting time data reflecting an amount of time one or more entities access at least one web page of a web page path; and based on the time data and an analysis of the determined frequency of traversals, reconfiguring at least one of the one or more websites.

8. The method of claim 3, wherein each of the web page paths reflects a set of web page accesses at the one or more websites, each set of web page accesses having the same number of web page accesses.

9. A system for analyzing web paths associated with accesses to one or more web pages associated with a plurality of websites, comprising:

a storage component including a storage that stores time of access data reflecting a time of access associated with each instance of a web page access of the one or more web pages associated with the plurality of websites, page access data reflecting an identification of each accessed web page accessed, and entity data reflecting an entity associated with each instance of the web page access;

an analysis component including a processor that determines, for each entity reflected in the storage, one or more web page paths traversed by the entity based on at least the time of access data and the page access data, wherein each web page path includes accesses to at least two web pages, the page access data includes a web page code, and each web page path includes a set of web page codes configured in consecutive time order, such that a time of access difference between a first time and a second time is less than a predetermined time period, wherein the first time reflects a time that a first web page of any two consecutive web pages reflected in the web page codes is accessed, and the second time reflects a time that a second web page of the any two consecutive web pages is accessed, determines, based on the determined one or more web path paths, an average access time for each web page of the plurality of websites;

and analyses entity interaction with the plurality of websites, based on the average access times and the determined one or more web page paths; and a display that displays information reflecting the entity interaction, including at least an indication of whether a web page is bypassed by the entity in traversing the plurality of websites, based on the analysis.

10. The system of claim 9, wherein the analysis component determines each web path based on a time order of the stored time of access data.

11. The system of claim 9, wherein the analysis system further determines:

a plurality of web paths traversed on the one or more websites, based on a plurality of entity accesses to the one or more websites; and for each of the plurality of web paths, a frequency of traversals of the web path.

12. The system of claim 11, wherein the frequency of traversals for each web path of the plurality of web paths is determined according to a number of traversals of the web path, or according to a percentage of the number of traversals of the web path in relation to a number of overall web path traversals on the one or more websites.

13. The system of claim 11, wherein the analysis system:

analyzes the frequency of traversals of each web path traversed on the one or more websites; and presents information to a user, wherein the information is used to reconfigure at least one of the one or more websites based on the analysis.

14. The system of claim 13, wherein at least one of the one or more websites is reconfigured by one or more of:

changing web page references on the one or more websites;

combining contents or references from separate web pages of the one or more websites onto a common web page;

inserting one or more web page references into one or more web pages of the one or more websites; and removing one or more web page references from one or more web pages of the one or more websites.

15. The system of claim 11, wherein:

the analysis system collects time data reflecting an amount of time one or more entities access at least one web page of a web path; and a web design system is used to reconfigure at least one of the one or more websites, based on the time data and the analysis of the determined frequency of traversals.

16. The system of claim 11, wherein each of the web paths reflects a set of web page accesses at the one or more websites, each set of web page accesses having the same number of web page accesses.

17. A computer-implemented method for analyzing web page paths associated with accesses to one or more web pages associated with one or more websites, comprising:

storing in a storage, time of access data reflecting a time of access associated with each instance of a web page access of the one or more web pages, page access data reflecting an identification of each accessed web page, and entity data reflecting an entity associated with each instance of the web page access;

for each entity reflected in the storage, determining, by a processor, one or more web page paths traversed by the entity based on at least the time of access data and the page access data, wherein each web page path includes accesses to at least two web pages, the page access data includes a web page code, and each web page path includes a set of web page codes configured in consecutive time order, such that a time of access difference between a first time and a second time is less than a predetermined time period, wherein the first time reflects a time that a first web page of any two consecutive web pages reflected in the web page codes is accessed, and the second time reflects a time that a second web page of the any two consecutive web pages is accessed;

determining, by the processor, based on the determined one or more web page paths, an average access time for each web page of the plurality of websites;

analyzing, by the processor, at least one of the one or more websites or at least one of the one or more web pages, based on the determined one or more web page paths, the average access times, and page access data indicating path traversals of a predetermined number during an overall time period to determine one or more statistical values indicating at least whether a web page is bypassed by the entity in traversing the plurality of websites; and providing, by the processor, the one or more statistical values to one or more users or software processes.

* * * * *